United States Patent [19]

Haase

[11] Patent Number: 5,382,417

[45] Date of Patent: Jan. 17, 1995

[54] PROCESS FOR REMOVAL OF SELECTED COMPONENT GASES FROM MULTI-COMPONENT GAS STREAMS

[75] Inventor: Donald J. Haase, Nixon, Tex.

[73] Assignee: Herr Haase, Inc., Nixon, Tex.

[21] Appl. No.: 58,677

[22] Filed: May 4, 1993

Related U.S. Application Data

[63] Continuation of Ser. No. 704,361, May 23, 1991, abandoned, which is a continuation-in-part of Ser. No. 460,309, Jan. 3, 1990, abandoned.

[51] Int. Cl.$^6$ .................. B01D 53/14; B01D 53/34
[52] U.S. Cl. .................. 423/219; 423/210; 423/245.2; 423/246
[58] Field of Search .......... 423/228, 246, 245.2, 423/219, 210; 585/849; 556/110; 55/68; 95/230

[56] References Cited

U.S. PATENT DOCUMENTS

| | | | |
|---|---|---|---|
| 2,519,284 | 8/1950 | Ray | 423/246 |
| 2,557,923 | 6/1951 | Ray | 585/849 |
| 2,589,960 | 3/1952 | Ray | 585/849 |
| 2,943,060 | 6/1960 | Smith | 252/182.29 |
| 3,026,172 | 3/1962 | Hirschbeck | 423/245.2 |
| 3,233,004 | 2/1966 | Hirshbeck | 423/246 |
| 3,651,159 | 3/1972 | Long et al. | 585/848 |
| 3,658,463 | 4/1972 | Billings | 423/246 |
| 3,855,327 | 12/1974 | Billings | 585/257 |
| 3,887,600 | 6/1975 | Long et al. | 556/27 |
| 3,914,266 | 10/1975 | Hay | 556/110 |
| 4,141,960 | 2/1979 | Long et al. | 423/417 |
| 4,590,288 | 5/1986 | Klemann | 556/112 |
| 4,662,905 | 5/1987 | Matsuura et al. | 55/168 |
| 4,790,945 | 12/1988 | Baker | 210/712 |
| 4,818,255 | 4/1989 | Matsuura et al. | 423/247 |
| 4,950,462 | 8/1990 | Nakao et al. | 423/246 |

FOREIGN PATENT DOCUMENTS

| | | | |
|---|---|---|---|
| 59-36522 | 2/1984 | Japan | 95/230 |
| 61-103519 | 5/1986 | Japan | 95/230 |
| 62-201622 | 9/1987 | Japan | 423/245.3 |
| 63-205117 | 8/1988 | Japan | 95/230 |
| 626796 | 8/1978 | U.S.S.R. | 55/68 |

OTHER PUBLICATIONS

Weast, R. C., ed. "CRC Handbook of Chemistry and Physics", CRC Press: Cleveland, 54th Edition (1973), pp. C-290, and B-87.

Haase, D. J. "New Carbon Monoxide Separation Technology", Proceedings of the American Institute of Chemical Engineers 1990 Spring National Meeting (Mar. 19-22, 1990), Fuels and Petrochemical Division, Gas Treating Fundamentals II Symposium, paper No. F.

"Complexing of Copper (II) Chloride with Aliphatic Amines in Benzyl Alcohol", Chemical Abstracts, 92, #100318C (1980).

Strelzoff, S. "Technology and Manufacture of Ammonia", New York: Wiley-Interscience (1981), pp. 193, 251-252.

Cotton, F. A., et al. "Adavanced Inorganic Chemistry", Fourth Ed. Wiley: New York (1981), pp. 800, 810, 814.

Lang, Wilhelm, "Einwirkung von Pyridin auf Metallsaize," Berichte der Deutsche Chemischen Ges., vol. 21, pp. 1578-1589 (1888).

Jones, W. A., "A Contribution To Our Knowledge of Dicarbonyl Cuprous Chloride," American Chemical Journal, vol. 22 pp. 287-311 (1988).

(List continued on next page.)

Primary Examiner—Michael Lewis
Assistant Examiner—Peter DiMauro
Attorney, Agent, or Firm—Arnold, White & Durkee

[57] ABSTRACT

A method of purifying multi-component gas streams, comprising the steps of stabilizing an absorbent solution which comprises a Group I-B metal halide amine, contacting said absorbent solution with said multi-component gas stream, complexing ligands and reactable components in said gas stream with said Group I-B metal halide amine, decomplexing and recovering said ligands and reactable components either separately or in mixture, and recycling said absorbent solution for contact with said multi-component gas stream.

18 Claims, 1 Drawing Sheet

OTHER PUBLICATIONS

Malik, A. U., "Coordination Compounds of Copper (I) Chloride With Pyridine and Related Ligands," Zeitschrift Fur Anorganische and Allegemeine Chemie. Band, vol. 344, pp. 107–112 (1966).

Wilkins, R. G. and Burkin, A. R., "Complexes Between Metal Salts and Long-Chain Aliphatic Amines, Part II. The Complexes of Cuprous Halides With Long Chain Aliphatic Amines," J. Chem. Soc., pp. 127–132 (1950).

Wilkins, R. G. and Burkin, A. R., "Complexes Between Metal Salts and Long-Chain Aliphatic Amines, Part III. The Oxidation of Copper (I) Complexes to Copper (II) Complexes," J. Chem. Soc., pp. 132–136 (1950).

Jardine, F. H., "Copper (I) Complexes," Advances in Inorganic Chemistry and Radiochemistry, vol. 17, 114–163 (Academic Press, 1975).

Pasquali, M. and Floriani, C., "Copper (I)–Carbon Monoxide Chemistry: Recent Advances and Perspectives," Copper Coordination Chemistry: Biochemical and Inorganic Perspectives, pp. 311–329 and 316–320 no date.

Kohl, A. L. and Riesenfeld, F. C., Gas Purification (Third Edition, Gulf Publishing Company 1979), pp. 718–739.

Haase, D. J. and Walker, D. G., "Cosorb-A Process for the Recovery of Carbon Monoxide," Fourth Joint Chemical Engineering Conference, Vancouver, B.C., Canada (Sep. 9–12, 1973).

"The Cosorb Process, Status–1979".

PROCESS FOR REMOVAL OF SELECTED COMPONENT GASES FROM MULTI-COMPONENT GAS STREAMS

This application is a continuation of application Ser. No. 704,361, filed May 23, 1991, now abandoned, which is a continuation-in-part application of Ser. No. 07/460,309, filed Jan. 3, 1990 which has been abandoned.

FIELD OF THE INVENTION

This invention relates generally to the selective removal or recovery of component gases from mixtures of gases. In one aspect, the invention concerns the removal of impurities from hydrocarbon and industrial gas streams such as synthesis gas and off-gas streams from refineries and chemical plants. In a more specific aspect, the invention relates to a method of removing both ligands and reactable components from a gas stream using a copper chloride amine liquid treating agent, and controlling the treating agent for increased effectiveness and efficiency.

BACKGROUND

Several methods have been used in the past for removing carbon monoxide and other gaseous materials from mixtures of gases. Copper salts, e.g., cuprous chloride, have been used as early as 1850 to dissolve carbon monoxide. Another method, called the "Cosorb" process, generally has involved contacting a hydrocarbon stream with a cuprous tetrachloroaluminate toluene complex in a toluene solution. Still another method, sometimes called the "copper-liquor" process, has involved contacting a hydrocarbon stream with an aqueous copper ammonium salt solution.

These past methods unfortunately have suffered from various shortcomings. Cuprous chloride, for example, generally requires a highly corrosive environment. The Cosorb process is typically unable to handle even relatively small amounts of water, so that, in a continuous process, an additional step is often required to minimize or remove water from the gas stream being treated. Finally, aqueous copper ammonium salt solutions are relatively corrosive and unstable.

SUMMARY OF THE INVENTION

The present invention offers an improved system for addressing the aforementioned deficiencies by employing a treating agent which has both complexing and reactive capabilities for removing component gases from industrial gases. The invention is especially useful in removing carbon monoxide from hydrocarbon gases. However, it is also useful in removing other components such as ethylene, propylene, xylene, oxygen, carbon dioxide, hydrogen sulfide, mercaptans, carbonyl sulfide and carbon disulfide. Thus, the invention is further useful in treating gases other than hydrocarbon gases, as for example, refinery off-gases, coke oven gases, basic oxygen furnace gases, gases from phosphorus or carbon black furnaces and synthesis gases, whenever such gases have contaminants or selected components such as those described above. The invention is also applicable to the isolation and purification of gases.

The invention in a general aspect comprises treating a gas containing a component gas which forms a ligand with a liquid cuprous halide amine; separating the resulting complex from the gas; regenerating the complex to recover the component gas and the cuprous halide amine; and recycling the cuprous halide amine to the treating step. A critical feature of the process resides in controlling the composition of the liquid amine treating agent to obtain a solids-free liquid. The control also provides a critical presence of cuprous and cupric ions in the liquid treating agent. This may be simply and effectively done by visual testing and control, but it may also be done by the use of photometers or other instruments which are sensitive to the presence of solids in liquids. In a particularly attractive embodiment, the color of the clear treating agent is maintained within an amber range. The agent may comprise the liquid cuprous halide amine itself or a solution of the same.

When practicing the process of the invention, it has been observed that a cuprous halide amine liquid treating agent, especially a cuprous chloride amine, may vary considerably in color and clarity. In all instances it has been observed that the presence of solids detracts from the performance of the process. It has also been observed that treating agents having substantial reddish tones, including orange, orange-red, red and brown, produce results which are progressively less desirable. On the other hand, treating agents which are amber in color are solids-free and consistently perform well in the invention. Green treating agents that are solids-free are also satisfactory in many applications. In some instances, green treating agents may perform less effectively when ethylene is present in the gaseous stream because oxygen in the green treating agent may react with the ethylene. It is contemplated that similar inefficiencies would occur with other unsaturated hydrocarbons.

An important aspect of the invention is the control of solids in the system. The "solids" that are controlled for the practice of this invention are insoluble compounds whose formation is easily reversible but does not refer to copper metal, whose formation is substantially irreversible. Although control of a process of the invention based on the above criteria is relatively simple and straightforward, the mechanisms responsible for the criteria are not entirely understood. If insufficient cupric ions are present, the treating agent tends to develop reddish solids. Conversely, the occurrence of reddish solids may be reduced by the presence of cupric ions. The concentration of cupric ions, however, should be also kept insufficient to form insolubles. This upper concentration level may vary from one system to the next; however, it appears it should generally be less than about one percent of the total concentration of copper halide amine present. Excessive cupric chloride concentrations have been observed to result in the formation of black or dark precipitates which may cling to surfaces they contact. The compositions of these precipitates have not been fully explored; however, they may involve cupric hydrous oxides or oxidation products. In any case they affect process efficiencies adversely. The presence of murky reddish materials in a treating agent may be rectified by the addition of cupric halides and/or oxygen or an oxygen-containing gas.

When treating a gas containing components which act as ligands with cuprous halide amines, the temperature of the treatment should be suitable for the ligands to form. In general, this temperature should be less than about 60° C., and preferably about 50° C. or less. The temperature should also be such that the copper halide amine treating agent is liquid and has a sufficiently low viscosity to mix readily with the gas being treated. To this end, the copper halide amine agent may be diluted with further amine or with water, alcohol, or other suitable solvent to reduce the viscosity of the agent as necessary. It is preferred, however, that no solvent be added to the agent. If solvent must be added, it is further preferred that the solvent be the same amine as the amine already in the treating agent. It will be noted that water may be present in the gas being treated, but this water normally does not remain with the treating agent following such treatment. The presence of water or other solvents in the treating agent detracts from the efficiency of the process. Solvents such as water also tend to give rise to corrosion problems, excessive cupric ion concentrations, and the precipitation of solids, including metallic copper.

Amine treating agents in solution form have been prepared which have been liquid down to as low as 15° C. Solutions with higher crystallization temperatures are generally desirable, however, because they have a higher concentration of cuprous ions per liter of solution than diluted solutions having a lower crystallization temperature. Other preferred characteristics for cuprous halide amine treating agents include non-corrosiveness, relatively low volatility, stability, non-toxicity, low viscosity, and limited cupric solubility. Solvents such as water and alcohol may detract from these characteristics.

Amines used to form the treating agents of the invention should form agents which are liqueform at the treating conditions. The treating agents should be stable and non-corrosive, and they should have sufficiently low viscosity (approaching that of water) without the addition of solvents. The amines should also have low viscosity and be selected so as to not compete with component gases in the gas being treated in forming ligands with the copper. Thus, the amines should not, in themselves, act as ligands with cuprous halide amines insofar as the process of the invention is concerned.

The basicity of the amines is also important, and is related to the ability of the amines to react completely with cuprous halides and to avoid uncontrollable levels of solids. Less basic amines, particularly amines having aniline structures such as aniline, N-methylaniline, ethylaniline, N-N-dimethylaniline, O-xylidine, toluidine, and diphenylamine tend to possess such shortcomings. These amines tend to be unstable in the presence of oxygen.

Benzylamine and 2-methylpentamethylenediamine (e.g., "Dytek A," manufactured by DuPont) have both been found to be the most effective amines in the practice of the invention. These amines are much more basic than the aniline amines, and they possess combinations of properties that make them especially preferred. The treating agents made with these amines are stable, and their low viscosities provide for very efficient treating operations. The freezing temperatures of the agents make them liquid in typical industrial environments, but they are sufficiently non-volatile to simplify stripping operations and the equipment employed in such operations. Desorption of gases liganded with the treating agents occurs at temperatures high enough to proceed rapidly, but the temperatures are not so high as to cause substantial degradation of the treating agents.

Benzylamine and 2-methylpentamethylenediamine are also especially desirable in that the treating agents made with these amines provide effective cuprous ion concentrations (about 1.9 to 2.3 mols per liter of treating agent) combined with reasonable freeze point and viscosity characteristics.

Cyclic amines having pyridine structures are generally more basic than anilines and are preferred over anilines. The pyridines, however, are much less preferred than benzylamine and 2-methylpentamethylenediamine. They are generally less basic and less effective and efficient. They also have excessive solubility for cupric halides, thus complicating the process of the present invention.

Benzylamine and 2-methylpentamethylenediamine are much preferred over mono-, di- and tri- alkyl, aryl and alkanol amines; other diamines; triamines; amides such as formamide and acetamide; and mixtures thereof. These other amines, in general, are lacking in one or more of the characteristics desired for the invention. The amides, for example, have relatively low basicity; and the alkyl and alkanol amines, although more basic than the amides, tend to be unstable and form solids or even copper metal during reaction with the cuprous halide when forming the treating agents.

As noted above, treating temperatures for the formation of ligands with cuprous halide amines in accordance with the invention are preferably less than about 60° C. For example, a preferred complexing temperature is about 55° C. for a treating solution having a crystallization temperature of about 45° C. Preferably, the treating solution such as a cuprous chloride amine is liqueform at about 40° C. and has a boiling point of at least about 100° C. Decomplexing of the resulting complexes will normally be at temperatures greater than the complexing temperatures. Thus, it is contemplated that the decomplexing temperature associated with a given complexing temperature will be greater, and normally at least about 20° C. greater, than the complexing temperature. The exact selection of a suitable decomplexing temperature may to an extent be influenced by the volatility of the treating agent, the desired pressure of the decomplexed ligand and reactable components, and the desired quantities of ligands and reactable components that remain in the treating agent after it leaves the decomplexor. If the volatility becomes too high, it may become desirable to lower the volatility by increasing the pressure on the decomplexor.

As stated earlier, benzylamine and 2-methylpentamethylenediamine have been found to fulfill the above conditions in a particularly effective and flexible fashion.

To the extent that a gas to be treated contains acidic components such as carbon dioxide, hydrogen sulfide, or the like, the metal halide amine may be used to react with these components, and thereafter be separated from the gas to recover them either together or separately. The acidic components may then be regenerated from the treating solution by conventional methods such as heating and/or stripping. In general, the acidic components react or complex with the amine portions of the treating agent to form what are referred to as reaction products in this description. In contrast, the carbon monoxide, unsaturates, and oxygen complex or ligand with the cuprous portions and are referred to as ligands.

The removal of materials from a gas as ligands and reaction products may be carried out by treatment in a common stage or in separate stages. Thus, acidic reactants may be removed in a first stage by treatment with a suitable alkaline agent such as an amine. The gas, freed of the acidic components, may then be treated in a second stage with a metal halide amine to remove ligands and other complexing components. A preferred alkaline agent for use in the first stage would normally be the same amine used to form the metal halide amine.

Effective treating agents of the invention, as stated above, are copper halide amines in the cuprous state. It is contemplated that other Group I-B metal halide amines, notably silver and gold halide amines, may also be employed; however, these latter amines are less preferred for reasons such as cost and availability.

Suitable halides include chlorides, fluorides, bromides, and iodides, with chlorides preferred for reasons of cost, availability, and proven effectiveness.

Suitable amines for the invention should be relatively nonvolatile liquids at the operating conditions to be employed. They should also be noncorrosive and capable of being diluted with water. Further, they should be capable of complexing with copper halides, especially cuprous chloride, to form complexes which are also relatively nonvolatile liquids at the operating conditions within the decomplexor.

If the amine treating agent proves too viscous for easy processing, it should be capable of being diluted with solvents, such as water, an aliphatic alcohol, or an amine, without becoming unstable. The amine in the amine portion of the treating agent will normally be the preferred solvent to employ for diluting or lowering the viscosity of the copper halide amine treating agent. Water and aliphatic alcohols such as ethanol or propanol are much less preferred. Although other aliphatic alcohols having higher molecular weights may be used, such as butanol or hexanol, the cuprous halide concentrations of solutions diluted to desirable viscosities with such solvents may be insufficient to remove complexible or reactable component gases at the desired rate.

In formulating a metal halide amine of the invention, the halide and amine are selected to be of the general formula $MN_n$, wherein M represents the metal halide, N represents the amine, and n is the number of moles of amine for each mole of the halide. Thus, a typical halide amine formulated from cuprous chloride and benzylamine may be designated as $(CuCl)(C_6H_5CH_2NH_2)_4$, or more conveniently as cuprous chloride:4-benzylamine or (cuprous chloride)(benzylamine)$_4$. It will be noted that cuprous chloride is sometimes expressed as the dimer, $Cu_2Cl_2$; however, it will be referred to as the monomer in this description of the invention.

In formulating the metal halide amine, it is generally desirable that the moles of amine per mole of cuprous halide be between about 4:1 and 6:1. Preferably the ratio should be slightly greater than 4:1, as for example, about 4.05:1 to help insure not going below 4:1. The amine in excess of the stoichiometric amount of 4:1 acts as a solvent for the liquid treating agent. As noted earlier, the complex may be dissolved in a solvent such as water or a compatible alcohol or amine. As further noted, however, a preferred solvent is the same amine as the amine portion of the treating agent. While water and alcohol may lower viscosity of the treating agent and increase the level of cupric ions, they introduce complexities in the stability of the system. Water, for example, tends to require longer times at the same temperature to maintain a solids free agent with an amber color. In particular, the resulting treating solution should be clear, having substantially no solids, and be amber in color.

In a specific aspect, the invention may be directed to removing a ligand, such as carbon monoxide, from a gas stream, and also removing reactable components which may also be present in the stream, such as carbon dioxide, hydrogen sulfide, mercaptans, carbonyl sulfide, and carbon disulfide. Although the carbon monoxide and the reactable components are preferably removed from the off-gas stream in the same step, they may be recovered from the treating solution either separately or as a mixture.

In a preferred aspect of this invention, a continuous process for removing carbon monoxide from a multicomponent gaseous stream comprises (a) visually testing or observing the liquid treating agent for clarity and a proper balance of cupric and cuprous ions, and (b) balancing the treating agent as may be necessary to obtain a solids-free green-colored agent or, more preferably, a solids-free amber-colored agent, both of which are visually indicative of a properly balanced treating agent. Such balancing may be attained by adding carbon monoxide, hydrogen, or other suitable reducing agents, on the one hand, or cupric ions, oxygen, or other suitable oxidizing agents on the other hand, as explained in greater detail elsewhere in this description.

An advantage of visually testing the treating agent for the proper balance is that an operator may conveniently and accurately monitor the cupric/cuprous balance throughout the continuous process without expensive equipment. A further advantage of visually testing the treating agent for proper balance is that an operator may detect the location of air leaks should they occur (indicated in a reddish or amber treating agent by formation of a green color in the treating agent). A still further advantage of visually testing the treating agent for proper balance is that the operator is able to know exactly when the system requires balancing and whether oxygen or carbon monoxide may be used to achieve the proper balance. Yet a further advantage of visually testing the treating agent for proper balance is that it provides improved flexibility for operating a continuous process in that a wide range of cuprous concentrations, complexing/decomplexing temperatures, and pressures may be used. Yet another advantage of the invention is that the amount of a balancing or stabilizing agent, e.g., carbon monoxide or oxygen, needed to restore the proper balance need not be tediously measured by the operator; rather, the agent is simply added until the desired green or amber color is obtained. Testing and balancing steps are discussed in greater detail below.

In the course of multiple complexing/decomplexing cycles, the treating agent may become greenish in color, indicating excess oxygen. The greenish color may occur, for example, when excess oxygen contacts the treating agent, either during the balancing step (as described below, where oxygen is used to remove a reddish haze) or during the course of the process, when oxygen may inadvertently contact the treating agent. In accordance with the invention, the treating agent may be balanced and the greenish color removed by contacting the treating solution at a sufficiently high temperature, e.g., above 70° C., with carbon monoxide in an amount sufficient to achieve an amber-colored treating agent and thereby restore the proper cupric/cuprous balance. In general, it is desired that the cupric ion concentration be maintained as low as possible, consistent with avoiding reddish colors or tones in the treating agent. In a system to which no water or alcohol is added, the cupric ion concentration should normally be less than about one percent of the total copper concentration.

In the course of multiple complexing/decomplexing cycles, the treating agent may also become reddish or reddish brown in color. This may occur, for example, when carbon monoxide in a gaseous stream contacted with a treating agent during the complexing step causes depletion of cupric ions in the treating agent. Excessive depletion of cupric ions tends to cause a reddish precipitate which is detrimental to a continuous complexing process. In the balancing step, the reddish treating agent may be converted to an amber color at any point in the system by replacing the depleted cupric ions or, preferably, by contacting the treating agent with an effective amount of oxygen. When excess oxygen is used (above that required to remove the red or brown precipitate), the reddish treating agent normally becomes green and solids-free, which may in turn be converted to amber by adding carbon monoxide.

DETAILED DESCRIPTION AND PREFERRED EMBODIMENT

Figure 1:
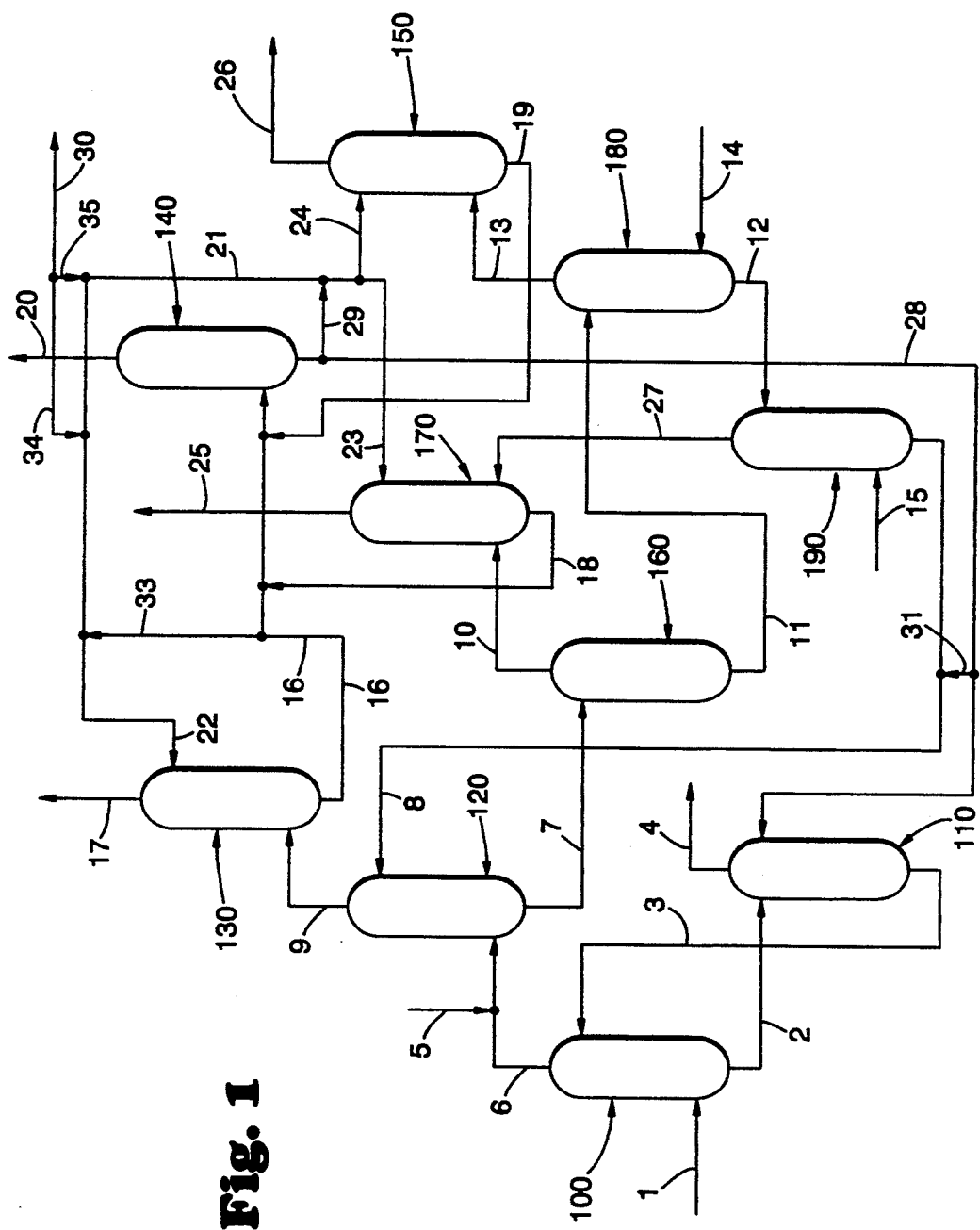
FIG. 1 is a flow chart showing a continuous process for removing carbon monoxide and other components from a gaseous stream.

A preferred embodiment of the invention resides in a method of removing ligands such as carbon monoxide or ethylene, and reactable components such as carbon dioxide, from multi-component gaseous streams. The method comprises the steps of: contacting a treating agent comprising a sufficient amount of a suitable complexing agent with the gaseous stream to provide for complexing of any ligands and/or reacting of the reactable components with the complexing agent; transferring the ligand and/or reactable component-containing treating agent away from the gaseous stream; decomplexing or recovering the carbon monoxide and/or the reactable components from the treating agent; balancing or stabilizing the treating agent as may be necessary by contacting it with a stabilizing agent; and recycling the stabilized treating agent for further contact with the gaseous stream. In a preferred aspect, the stabilized treating agent is substantially free of solids. Further, the treating agent should be maintained at a sufficiently high temperature to avoid crystallization of the complexing agent; conversely, the complexing agent should be formulated to be liquid throughout the process.

The gaseous streams of this invention comprise one or more components which form ligands with metal halide amine, and may contain reactable components and other components which are inert to the metal halide amine. Generally inert components include nitrogen, paraffin hydrocarbons and the rare gases. Gaseous streams treated in accordance with this invention may be gas streams occurring in industrial processes, particularly synthesis gas streams used in the manufacture of ammonia, alcohols, ethylene, gasoline, and so forth, which may include as major components $H_2$, $CO$, $CO_2$, and $N_2$, as well as small amounts of methane (e.g., from about 0.2% to about 5%) and oxygen. Such gas streams also include synthesis gas streams produced by the partial oxidation of natural gas, naphtha or coal; synthesis gas streams from steam and catalytic reforming of hydrocarbons; and thermal and hydrothermal cracking of hydrocarbons. The streams may also be hydrocarbon streams containing different species of hydrocarbons in various amounts. Such streams may also be off-gases from basic oxygen furnaces, direct coal gasification processes, refineries, phosphorus furnaces, and carbon black furnaces.

The term "ligand" generally refers to coordinating or complexing Lewis bases, i.e., electron pair donors. For the purposes of this description, "ligands" are those gaseous ligands which complex with cuprous metal halide amines. Typically, these ligands include carbon monoxide, oxygen, and unsaturated hydrocarbon compounds, such as ethylene, propylene, acetylene, methylacetylene, vinyl acetylene and aromatics. The complexing is normally with the copper portion of the cuprous halide amine.

The "reactable components" of this invention are compounds, other than the above "ligand" compounds, found in gaseous streams that complex or react with the complexing agent, normally with the amine component or portion of the complexing agent. Such reactable components may include carbon dioxide, hydrogen sulfide, mercaptans, carbonyl sulfide, and carbon disulfide. Thus, a typical reaction might be between a complexing agent, such as cuprous chloride:4-benzylamine, with a reactable component such as carbon dioxide.

In a broad aspect, the complexing agent comprises any compound capable of complexing with the ligand components and reacting or complexing with the reactable components of a gas. The complexing agent comprises a Group I-B metal halide amine compound or complex having the formula $MN_n$, where M represents the Group I-B metal halide. The Group I-B metal may be copper, silver, or gold, although primarily because of proven effectiveness, copper is preferred. The halide may be chlorine, fluorine, bromine, or iodine, although chlorine is preferred because of its availability and proven performance.

N represents an amine, with n being the coordination number or ratio, i.e., the number of amines coordinated to the metal. As noted earlier, preferred amines are 2-methylpentamethylenediamine and benzylamine.

A treating agent comprising a complexing agent may be prepared by reacting M, the Group I-B metal halide amine, with N, the amine, and adding solvent as may be necessary. The treating agent, which is preferably a substantially solids-free, single-phase, homogenous system to which no water or alcohol is added, may contain an excess of N. The solvent N is preferably present in an amount slightly greater than the stoichiometric amount of about 4 moles per mole of cuprous chloride, to help insure not going below 4:1.

In a preferred aspect of the invention, the $MN_n$ compound retains certain desirable properties of M and N. For example, the monomeric compound $MN_n$ exhibits the ligand complexibility of M and the reactibility of N to enable it to remove both ligands and reactable components from a gaseous stream by contacting the gaseous stream with the complexing agent. In a preferred aspect of the invention, the monomeric $MN_n$ is in pure form, which may be evidenced by formation of a single crystal phase upon cooling the treating agent. The contacting step may comprise contacting the stream with a treating agent comprising the $MN_n$ compound, or first contacting the stream with N and then with the treating agent. In accordance with the invention, the ligands and reactable components may be recovered as either pure or mixed component product streams. Further, carbon monoxide may be decomplexed by catalytic in situ conversion with oxygen to carbon dioxide.

In a specific aspect, a treating agent comprising a complexing agent may be made by reacting a solid Group I-B metal halide, e.g., cuprous chloride, with a liquid amine, e.g., benzylamine, in amounts corresponding to the coordination ratio n. The coordination ratio, determined experimentally, is preferably 4 for Group I-B metal halide amines. Coordination ratios of 2 have been observed, but coordination ratios less than four are increasingly less preferred because they detract from the efficiency of the invention.

In a further aspect of the invention, a cuprous chloride:4-benzylamine solution may be obtained by reacting 1 mole of solid cuprous chloride with 4 moles of liquid benzylamine, at a temperature ranging from about 60° C. to about 90° C. Preferably, the temperature of the solution is maintained at about 80° C. during reaction. Also in accordance with the invention, a solution comprising cuprous chloride:4-(2-methylpentamethylenediamine) may be obtained by adding 1 mole of solid cuprous chloride to 4 moles of 2-methylpentamethylenediamine. Alternatively, cuprous chloride:2-(2-methylpentamethylenediamine) may be made by adding 1 mole of cuprous chloride to 2 moles of 2-methylpentamethylenediamine.

In accordance with this invention, a variety of complexes may be formed during the complexing step, depending on the types of component gases present in the multicomponent gaseous stream and the conditions, e.g., temperature and pressure, of the complexor. For example, oxygen in the gaseous stream may form a complex with a treating solution comprising a cuprous halide amine, which is then often seen as a greenish-colored solution. At a sufficiently high temperature, e.g., at least about 70° C. to about 80° C., the oxygen decomplexes, thus removing the greenish color. In the presence of carbon monoxide, and at the same temperatures, the oxygen may react with the carbon monoxide to form carbon dioxide.

Reactable component gases, e.g., carbon dioxide or acidic components which react with the amine portion of the cuprous halide amine, react with the cuprous halide amine, to remove the reactable components from the gaseous stream. For example, carbon dioxide reacted during complexing with the cuprous halide amine may be released from the cuprous halide amine during the decomplexing step by increasing the temperature. If a ligand, e.g., carbon monoxide, is also present with carbon dioxide as a component of the gaseous stream, both the ligand and the reactable component may combine with the cuprous halide amine to form a ligand:cuprous halide amine:reactable complex, e.g, carbon monoxide:cuprous chloride:4-benzylamine:carbon dioxide. Thus, both the ligand and the reactable component may be removed from the gaseous stream in the complexing step and subsequently removed from the treating solution during the decomplexing step to recover the ligand and the reactable component either separately or as a mixture.

In an embodiment of the invention, a product of high purity carbon monoxide may be continuously produced from a hydrocarbon-containing gaseous stream as described below and as shown in the flow diagram shown in FIG. 1. It is noted that the flow diagram is not intended to include all process details such as reactant amounts, process conditions, pumps, valves, heaters, and chillers, which may be readily supplied within the skill in the art.

A gas stream 1, comprising hydrogen, carbon monoxide, carbon dioxide, water, and methane as major components, enters the absorber column 100, countercurrently contacting a stream 3 of benzylamine whereby the carbon dioxide is removed with the benzylamine in stream 2 and enters the stripper column 110.

In the stripper column 110, heat is applied to remove the carbon dioxide from the benzylamine. The carbon dioxide exits via stream 4, and the benzylamine stream 3 returns to the absorber column 100. In the complexor 120, a cuprous chloride-4-benzylamine (hereinafter referred to as BACUS) stream 8 is contacted countercurrently with gaseous stream 6 to chemically complex the carbon monoxide and oxygen and to physically absorb small quantities of the other components. The loaded BACUS stream, along with most of the water, then exits via stream 7. In one aspect of the invention, the gas stream 6 which lacks carbon dioxide may be combined with an oxygen stream 5 before entering the complexor 120 to provide means for balancing the cuprous/cupric ratio in the BACUS stream as may be necessary or desirable. The BACUS stream may thereby be contacted with gaseous stream 6 containing controlled amounts of oxygen. Thus, sufficient oxygen may be introduced to maintain a green color in preference to a reddish color in the BACUS stream.

The gas stream 9, now consisting essentially of methane and hydrogen, exits to recovery column 130 where it is chilled and contacted countercurrently with stream 22, and where traces of benzylamine may be removed from gas stream 9 via stream 16. Stream 16 which comprises benzylamine is chilled and returned to stream 22 through return line 33 except for a portion that may be routed to the separation column 140, which separates water from benzylamine. Heat is applied to the bottom of column 140. Vapor comprising water and benzylamine are thereby driven up the column. Water, having a lower boiling point, exits overhead while the higher boiling point benzylamine refluxes inside the column and exits at bottom. When chilled benzylamine is used in recovery column 130, the separation column 140 produces water vapor which may be directed to vent 20 or to storage via stream 30. The recovered benzylamine then exits the separation column 140 via stream 28 or streams 29 and 21. The benzylamine may then be sent to the recovery column 150 via stream 24 or recycled to column 130 via stream 22 or directed to column 170 via stream 23.

In place of chilled benzylamine, chilled water may be used in column 130. Accordingly, the separation in column 140 should produce water which exits via stream 20 and which may be vented or disposed of through stream 30. Alternatively, the water may be directed back to recovery column 130 via streams 20, 34, and 22 or it may be sent to recovery column 170 via streams 20, 30, 35, 21 and 23. When chilled water is used in column 130, the benzylamine exits the bottom of the separation column 140. Thus, recovered benzylamine exits the separation column 140 via stream 28 and returns to stripper 110 and/or to the complexor 120 via streams 31 and 8.

Stream 7, the carbon monoxide-rich BACUS stream, goes to the purification column 160 where physically dissolved components (e.g., hydrogen, methane, and some water) are removed and directed via stream 10 to chilled recovery column 170 for countercurrent contact with stream 23, and are vented via stream 25. Chilled stream 18 exits to join stream 16. The purified carbon monoxide rich BACUS stream 11 is then sent to the decomplexor 180 wherein the BACUS solution is heated, thereby decomplexing stream 11 to form a separate BACUS stream 12 and carbon monoxide stream 13, which may contain some water. A stream 14 of oxygen may be introduced to decomplexor 180 to balance the cuprous/cupric ratio. The oxygen could also convert carbon monoxide, if present, to carbon dioxide.

The BACUS stream 12 goes to stabilizer 190 where conditions are maintained for reaction with stream 15 (comprising e.g., carbon monoxide, hydrogen, cupric ions, air, or oxygen) whereupon the BACUS solution may be balanced by controlling the amounts of balancing agent in stream 15. Gaseous reaction products exit as stream 27. The stabilized BACUS stream exits stabilizer 190 and is returned to complexor 120 via stream 8.

The carbon monoxide from decomplexor 180 is routed to stream 13 to a chilled recovery column 150 where it may be contacted countercurrently with chilled water or chilled benzylamine stream 24 to remove traces of benzylamine, carbon dioxide, and water, and exits as purified carbon monoxide stream 26. The exiting chilled liquid stream 19 is routed to stream 16.

In the case where the carbon monoxide and carbon dioxide are to be removed from stream 1, and only carbon dioxide is desired as the product, then the absorber 100, the stripper 110, and the purification column 160 are not required. In that case, stream 14 may be used to provide sufficient oxygen to convert carbon monoxide remaining after the decomplexing to carbon dioxide.

In practicing the above-described continuous process, the treating agent is preferably maintained at a minimum of about 1.5 moles cuprous ion per liter of treating agent, although the system may also operate at lower concentrations. Generally, the ratio of solvent to cuprous ion is selected by the operator based on certain operating requirements such as viscosity, boiling point, crystallization temperature, and rate of complexation. Viscosity relates to the rate of complexation and decomplexation; less viscous treating agents are contemplated to have better complexation and decomplexation characteristics. Accordingly, a treating agent may be adjusted to achieve a desired viscosity and concentration by adding a compatible solvent such as water, amine, or an alcohol. For example, a cuprous chloride:4-benzylamine solution having a desired viscosity and a concentration of 1.5 moles cuprous ion per liter of treating agent may be obtained by mixing solvent to the treating agent in the ratio up to about 13 moles of solvent per mole of cuprous ion. Referring to individual solvents, the ratio is 12.78 for water, 5.7 for methanol, 3.75 for ethanol, and 3.09 for propanol. If benzylamine is used as the solvent (without water or alcohol), the 1.5 concentration may be achieved by a benzylamine/cuprous chloride:4-benzylamine ratio of 2.11 and a total ratio of benzylamine/cuprous chloride of 6.11. Corresponding to the above, ratios for a cuprous chloride:4-pyridine solution would be 19.13 for water as the solvent, 8.52 for methanol, 5.9 for ethanol, and 4.61 for propanol. If pyridine is used as a solvent (without water or alcohol), the 1.5 concentration may be achieved by a pyridine/cuprous chloride:4-pyridine ratio of 4.27 and a total ratio of pyridine/cuprous chloride of 8.27.

The invention will be further clarified by consideration of the following examples which are intended to illustrate aspects of the invention.

EXAMPLES

Example 1

In this example, cuprous chloride:4-pyridine was formed. Measured amounts of 25.6 grams of solid cuprous chloride were mixed with 83.33 ml. of pyridine in a 500 ml. three-neck flask. One neck contained a rubber stopper with a thermometer inserted for monitoring the temperature of the solution. The second neck contained a glass tube for introduction of gases such as nitrogen, hydrogen, or carbon monoxide, the glass tube being inserted through a rubber stopper with the end of the tube near the bottom of the flask but above the stirring bar. The third neck was for introduction of the primary reactants. After the reactants were introduced, a condenser was placed in the third neck for removing excess gases. Nitrogen was used to purge oxygen gas from the flask, after which a nitrogen atmosphere was maintained. A manometer was connected to the gas stream exiting the condenser and a flowmeter was connected further downstream. Flowmeters were also connected to inlet streams for each individual gas.

The solution was heated, and the temperature of the solution increased from room temperature to 75° C., which was maintained until the solid cuprous chloride was completely reacted as evidenced by a single, liquid phase solution to produce a liqueform cuprous chloride:4-pyridine. The color of the solution at this point was dark green, almost black. Heat was applied to the contents of the flask with a hot plate to raise the temperature of the solution to 95° C. and the nitrogen feed stream was replaced with a continuous stream of carbon monoxide, which passed up through and contacted the solution via the glass tube in the second neck. Most of the carbon monoxide reacted with the oxygen in solution to lighten the dark green color, indicating decomplexation of the oxygen. At this stage, substantially no complexing of the carbon monoxide had taken place, although minute amounts of carbon monoxide would probably react to form a carbon monoxide:cuprous chloride:4-pyridine complex. It is contemplated, however, that, at this temperature, a much higher partial pressure on the system would be required to begin substantial complexing to form the complex throughout.

Next, to begin the complexing step, the solution was cooled with a water bath in 15 minutes to 45° C., the low temperature being used to maximize complexation of the carbon monoxide. Complexation continued until a pressure increase was recorded, indicating that no more complexing of the carbon monoxide was occurring, by which time the solution had turned a lighter green.

To begin the decomplexation step, the carbon monoxide feed gas was shut off, and heat was applied to the solution via a water bath surrounding the flask. As the temperature increased, carbon monoxide gas started decomplexing and by 70° C. was evolving rapidly. At about 75° C., the solution changed from green to the desired amber color.

Example 2

In this example, a cuprous chloride:4-(2-methylpentamethylenediamine) treating agent was made. Specifically, solid cuprous chloride was added to stirred liquid 2-methylpentamethylenediamine in the ratio of 1 mole of cuprous chloride to 4 moles of 2-methylpentamethylenediamine at ambient temperature and pressure.

The color of the treating agent was dark green, indicating oxygen in the flask complexed to the treating agent. The reaction—i.e., the formation of the treating agent, was complete as evidenced by complete disappearance of the solid cuprous chloride. The reaction vessel was closed and purged with carbon monoxide, which was introduced to form a complex with the cuprous chloride:4-(2-methylpentamethylenediamine). The temperature of the treating agent was then increased to and maintained at between about 70° C. and 90° C. At about 70° C., the carbon monoxide began to decomplex. The color of the treating agent changed from green to the desired amber color at about 75° C.

Example 3

A cuprous chloride:4-(2-methylpentamethylenediamine) was prepared in a manner similar to that described in Example 2. The clear amber treating agent was heated to and maintained at 130° C. under an atmosphere of carbon monoxide until a rusty red precipitate developed, indicating depletion of the cupric ions and reversible conversion of cuprous ions to solids. It is contemplated that this reddish color was caused by excess carbon monoxide and high temperature of the treating agent. The reddish color has been observed to also occur in other experiments at high temperatures under an inert gas atmosphere such as nitrogen. The temperature was then decreased to 80° C. at which point oxygen was introduced until a slight green tint developed. Here the red precipitate had been converted to a copper species which was soluble in the treating agent. Then, to obtain a clear amber color, carbon monoxide was passed through the treating agent, whereupon the treating agent returned to a desirable clear amber. The green tint, reflecting complexed oxygen, was removed by the carbon monoxide, yielding carbon dioxide.

Example 4

In this example, cuprous chloride:4-(2-methylpentamethylenediamine) was heated and contacted with carbon monoxide until a rusty red precipitate formed. To illustrate the effect of adding a non-amine solvent to the system, the treating agent was diluted with 4 moles of water per 1 mole of cuprous chloride. One mole of cupric chloride per 100 moles of cuprous chloride was then added to the solution at 83° C., after which the solution was cooled under a nitrogen atmosphere to about 65° C. to arrive at a dark, green-colored solution. The nitrogen feed gas was replaced with carbon monoxide, and the solution was reheated. By 70° C., a clear amber solution began to develop. The temperature of the solution was then reduced, and carbon monoxide was contacted with the liquid solution at 23° C. to form a complex with the cuprous chloride:4-(2-methylpentamethylenediamine). The temperature was then increased to greater than 80° C. to decomplex the carbon monoxide from the stabilized, clear amber solution. The solution remained amber throughout the complete cycle, from 23° C. to 80° C.

Example 5

In this example, cuprous chloride:4-benzylamine was made, followed by balancing of the treating agent via addition of solid cupric chloride. Specifically, solid cuprous chloride was added to stirred benzylamine in the ratio of 1 mole cuprous chloride to 4 moles benzylamine at ambient temperature and pressure. The reaction vessel was closed and purged with hydrogen. In this example, the presence of hydrogen resulted in a blackish solution, suggesting formation of precipitates. A hot pad was used to heat the solution to and maintain a temperature of from about 70° C. to about 90° C. until the reaction was complete, as evidenced by disappearance of the solid cuprous chloride in the clear black treating agent. Small amounts of solid cupric chloride were added until the cuprous chloride:4-benzylamine treating agent turned to the desired clear amber. Formation of the blackish material in the presence of hydrogen in this example, and of the reddish material in the presence of carbon monoxide in Examples 3 and 4, suggests that any precipitates present are not metallic copper but rather an intermediate compound whose formation is reversible in the present invention.

Example 6

In this example, to demonstrate effects of solvent, a brownish cuprous chloride:4-pyridine treating agent was diluted with 2 moles of pyridine and 3.7 moles of water per mole of cuprous chloride:4-pyridine. The crystallization temperature of the resulting solution was thereby lowered from 48° C. (for pure cuprous chloride:4-pyridine) to 10° C. and the color of the treating agent was changed from brown to bluish green. Carbon monoxide gas was passed through the solution beginning at 10° C. whereupon complexation began to occur. Heat was steadily applied, and at 50° C. carbon monoxide which had been complexed with the system began to decomplex. The temperature of the solution was raised to 70° C. and lowered back to 10° C. several times under a continuous carbon monoxide atmosphere, but the solution remained green throughout the aforementioned complexation/decomplexation cycles. Then heat was applied, and when the temperature of the solution was increased to 80° C., the solution changed to amber in color. The temperature was raised until the solution began to boil at 99° C., demonstrating that the boiling point was lowered as a result of adding water as solvent. By comparison, cuprous chloride:4-pyridine without water would be expected to have a boiling point about 115° C.

Example 7

To demonstrate the reversible complexation capacity of a stabilized solution, the cuprous chloride:4-pyridine solution described in Example 6, which had been balanced to an amber color, was cooled to ambient temperature under a carbon monoxide atmosphere and stored for two full months, during which time the color remained amber. The solution was then tested for its ability to reversibly complex carbon monoxide and ethylene. The same volume of solution was found, under similar operating conditions, to have the ability to successfully complex and decomplex either 1 volume of carbon monoxide or ½ volume ethylene.

Example 8

Cuprous chloride (34.03 grams) was added to 152 ml. of stirred liquid benzylamine (a slight molar excess) at ambient temperature. Within 30 seconds, the temperature rose to 100° C., resulting in a dark green solution of cuprous chloride:4-benzylamine in excess benzylamine. The dark green color indicated complexation of oxygen present in the flask. This solution, which was stored overnight at 33° C. as a green solid material, was heated to 55° C. to form a green solution. Excess oxygen was driven off with a carbon monoxide purge, which then complexed with the cuprous chloride:4-benzylamine. The solution was then rapidly heated to 150° C. to decomplex the carbon monoxide, forming a rusty brown precipitate. The solution was then cooled down to 41° C. under a carbon monoxide atmosphere until complexation was complete. At this point air was introduced to the system, thus forming a green solution. It appeared that oxygen in the air had first caused disappearance of the rusty brown precipitate, and had then complexed with the treating agent to provide the green color. Carbon monoxide was complexed during the cooling-down cycle between about 125° C. and 41° C. The unit was then shut down overnight whereupon the solution cooled down to a freezing point of about 27° C. The next day the solution was heated up, and substantial decomplexation began at about 50° C., continuing until about 125° C. Most of the carbon monoxide evolution occurred by about 90° C. The temperature of the solution continued to increase until about 138° C., by which time the solution was clear amber in color. The amounts of carbon monoxide complexed and decomplexed were roughly equivalent at 1.04 moles of carbon monoxide per mole of contained copper, i.e., the total amount of cupric and cuprous ions present in solution.

Example 9

In this example, a complete complexation/decomplexation cycle was performed using a dilute system. Specifically, water in the amount of 25 ml. was added to the solution described in Example 8 for dilution to about 4 moles of water per mole of cuprous ion. After the water was added to the solution, the cuprous chloride:4-benzylamine was complexed with carbon monoxide, and heat was applied. When the temperature reached about 50° C., carbon monoxide gas was released, indicating the beginning of the decomplexation of the carbon monoxide. The solution was almost completely decomplexed by a temperature of about 95° C. and substantially no additional carbon monoxide gas was released by 97° C.

From the foregoing description and examples, it will be recognized that the process of the invention may be applied to a variety of gas processing matters. Thus, the invention may be employed to remove gases such as carbon dioxide and carbon monoxide from nitrogen and hydrogen mixtures used as feed to an ammonia synthesis reactor. The invention may also be employed to remove ethylene and propylene from the stream produced by thermal cracking of naphthas. The invention also has application in removing carbon monoxide and light unsaturated hydrocarbons such as ethylene, propylene, butene, and butadiene from various off gases from refineries and chemical plants. The invention has further application in extracting a gas such as carbon monoxide with the purpose of purifying the gas. It will also be recognized that mixtures of gases extracted from a gas stream may be fractionated themselves to isolate the individual component gases. Alternatively, heat may be applied in a standard separation column to a treating agent during the decomplexing step to separate the individual component gases based on their relative volatilities over the treating agent, thus removing each component separately.

What is claimed is:

1. A method of removing a complexible ligand from a multi-component gaseous stream containing the complexible ligand, which gaseous stream is capable of reducing cupric ions in a liquid treating agent to form an insoluble precipitate, said method comprising the steps of:
    (a) forming a solution of liqueform cuprous halide amine compound having four moles of amine per mole of cuprous halide in a solvent;
    (b) including cupric ions in the solution to provide the liquid treating agent, said cupric ions occupying less than about one percent by moles of the total copper concentration;
    (c) contacting the liquid treating agent with the gaseous stream to form a complex between the ligand and the cuprous halide amine to transfer the ligand from the gaseous stream to the liquid treating agent;
    (d) maintaining the concentration of cupric ions under conditions where an insoluble precipitate would otherwise form in the treating agent at a level to inhibit precipitation and depletion of cupric ions in the treating agent and maintain the treating agent in a clear amber state;
    (e) decomplexing the ligand from the cuprous halide amine to remove the ligand from the liquid treating agent; and
    (f) recycling the liquid treating agent for contact with the gaseous stream.

2. The method of claim 1 in which the solvent is selected from the group consisting of amine, water, and alcohol.

3. The method of claim 1 in which the cupric ions are included by supplying an oxidizing agent to the liquid treating agent.

4. The method of claim 1 additionally comprising the step of monitoring the color of the treating agent and including the cupric ions when a reddish precipitate appears.

5. The method of claim 1 in which the cupric ions are included by adding cupric ions or an oxidizing agent when the treating agent contains reddish precipitates.

6. The method of claim 5 in which the cupric ions or oxidizing agent are added until the reddish precipitates dissolve.

7. The method of claim 1 in which the cupric ions are included by supplying oxygen and, when the treating agent turns green, carbon monoxide is then added to produce an amber colored treating agent.

8. The method of claim 1 in which said amine is selected from the group consisting of benzylamine and 2-methylpentamethylenediamine.

9. The method of claim 1 in which the ligand is carbon monoxide.

10. The method of claim 9 in which the gaseous stream additionally comprises carbon dioxide.

11. A continuous method of removing carbon monoxide from a gas stream, which gas stream is capable of reducing cupric ions in a liquid treating agent to form an insoluble precipitate, comprising:
    (a) forming a solution of liqueform cuprous halide amine compound selected from the group consisting of cuprous chloride:4-benzylamine and cuprous chloride:4(2-methylpentamethylenediamine) and a solvent to form the liquid treating agent;
    (b) including cupric ions in the liquid treating agent to provide a substantially solids-free amber colored treating agent, said cupric ions occupying less than about one percent by moles of the total copper concentration in the treating agent;

(c) contacting the liquid treating agent with the gaseous stream to form a complex between the carbon monoxide and the cuprous halide amine to transfer the carbon monoxide from the gas stream to the liquid treating agent;

(d) decomplexing the carbon monoxide from the cuprous halide amine to remove the carbon monoxide from the liquid treating agent; and (e) recycling the liquid treating agent for contact with the gas stream;

(f) said method further comprising the step of maintaining the concentration of cupric ions under conditions where an insoluble precipitate would otherwise form in the treating agent at a level to inhibit precipitation and depletion of cupric ions in the treating agent and maintain the treating agent in said substantially solids-free amber state.

12. The method of claim 11 in which the concentration of cupric ions is maintained by adding cupric ions or an oxidizing agent to the liquid treating agent after recycling and prior to contacting the liquid treating agent with the gaseous stream.

13. A method of treating a gaseous stream containing at least one ligand component gas capable of complexing as a ligand with a cuprous ion, and at least one non-ligand component gas which is neither capable of complexing with a cuprous ion nor of reacting with an amine, which gaseous stream is capable of reducing cupric ions in a liquid treating agent to form an insoluble precipitate, said method comprising the steps of:

(a) forming a solution of liqueform cuprous halide amine compound having four moles of amine per mole of cuprous halide in a solvent comprising water, alcohol or an amine;

(b) including cupric ions in the solution to provide the liquid treating agent, said cupric ions occupying less than about one percent by moles of the total copper concentration;

(c) contacting the gaseous stream with the liquid treating agent under conditions sufficient to form a complex between the cuprous halide amine and each ligand component gas of the gaseous stream;

(d) separating the resulting complexed liqueform cuprous halide amine from the contacted gaseous stream;

(e) decomplexing the separated complex liqueform cuprous halide amine under conditions sufficient to release each complexed component gas from the contacted gaseous stream;

(f) separating each decomplexed non-ligand component gas from the decomplexed cuprous halide amine of the treating agent;

(g) maintaining the concentration of cupric ions under conditions where an insoluble precipitate would otherwise form in the treating agent at a level to inhibit precipitation and depletion of cupric ions in the treating agent and maintain the treating agent in a clear amber state.

14. The method of claim 13 in which the ligand component gas is carbon monoxide, oxygen, an olefin or an aromatic.

15. A method of treating a gas stream containing a mixture of component gases including at least one ligand component gas which forms a ligand complex with the cuprous ion, at least one reversibly reactant component gas which reacts with an amine, and at least one inert component gas which is substantially inert to the cuprous ion and to amines, which gas stream is capable of reducing cupric ions in a liquid treating agent to form an insoluble precipitate, said method comprising the following steps:

(a) contacting the gas stream with a first treating agent comprising an amine under conditions and for a time sufficient to form a reaction product between the amine and each reactant component gas;

(b) separating the first treating agent containing each reaction product from the gas stream;

(c) recovering each reactant component gas from its respective reaction product and the first treating agent;

(d) contacting the gas stream with a second treating agent;

(e) said second treating agent comprising a liqueform cuprous halide amine compound consisting of four moles of amine per mole of cuprous halide together with a solvent;

(f) said second treating agent including cupric ions in the solution, said cupric ions occupying less than about one percent by moles of the total copper concentration;

(g) said contact between the gas stream and the second treating agent being under conditions and for a time sufficient to form a complex between the cuprous halide amine and each component gas;

(h) separating the second treating agent containing each complex from the gas stream; and (i) decomplexing each ligand component gas from its respective complex;

(j) said method further comprising the steps of forming a reddish precipitate in the second treating agent and removing said reddish precipitate by the addition of cupric ions or oxidizing agent.

16. A method of treating a feed stream of a mixture of gases containing at least one ligand component gas, at least one reversibly reactable component gas and at least one inert component gas, which feed stream is capable of reducing cupric ions in a liquid treating agent to form an insoluble precipitate which comprises the following steps:

(a) contacting the feed stream with a first stream comprising a liqueform cuprous halide amine compound having four moles of amine per mole of cuprous halide and a solvent, said amine comprising benzylamine or 2-methylpentamethylenediamine, said first stream being substantially free of solids and including cupric ions, said cupric ions occupying less than about one percent by moles of the total copper present in said first stream, said contact being in an amount, for a time and at a first temperature sufficient for the cuprous halide amine to form a ligand complex with each ligand component gas and to form a reaction product with each reversibly reactable component gas;

(b) separating the product stream mixture of step (a) into a product liquid stream comprising each ligand complex and each reaction product and a first product gas stream containing each inert component gas;

(c) heating the product liquid stream of step (b) for a time and at a second temperature higher than the first temperature and at a lower pressure sufficient to regenerate each said ligand component gas, each said reversibly reactable component gas, and said liqueform cuprous halide amine;

(d) separating each regenerated ligand component gas and each regenerated reactable component gas from the regenerated liqueform cuprous halide amine to form a second product gas stream comprising each recovered ligand component gas and each recovered reactable component gas; and (e) contacting the liqueform cuprous halide amine with sufficient cupric ions or oxygen under conditions where an insoluble precipitate would otherwise form in said liqueform cuprous halide amine to inhibit precipitation and depletion of cupric ions and to render the liqueform cuprous halide amine clear and amber.

17. The method of claim 16 in which the ligand component gas comprises carbon monoxide, oxygen, or an unsaturated hydrocarbon compound.

18. The method of claim 16 in which the reactable component gas comprises carbon dioxide, hydrogen sulfide, a mercaptan, carbonyl sulfide, or carbon disulfide.

* * * * *